(12) United States Patent
Nishikawa et al.

(10) Patent No.: US 8,447,467 B2
(45) Date of Patent: May 21, 2013

(54) METHOD AND SYSTEM FOR AUTOMATICALLY LOCKING DOORS OF VEHICLE

(75) Inventors: Yuji Nishikawa, Chiryu (JP); Kazuhiro Nakashima, Anjo (JP); Toshiyuki Konishi, Anjo (JP)

(73) Assignee: Denso Corporation, Kariya (JP)

( * ) Notice: Subject to any disclaimer, the term of this patent is extended or adjusted under 35 U.S.C. 154(b) by 316 days.

(21) Appl. No.: 12/932,692

(22) Filed: Mar. 3, 2011

(65) Prior Publication Data

US 2011/0276196 A1 Nov. 10, 2011

(30) Foreign Application Priority Data

Mar. 4, 2010 (JP) .................. 2010-48050

(51) Int. Cl.
*G06F 7/00* (2006.01)
*E05B 49/00* (2006.01)
*B60R 25/00* (2006.01)
*B60R 25/10* (2006.01)

(52) U.S. Cl.
USPC ............................. 701/36; 701/2; 701/29.1

(58) Field of Classification Search
USPC .............................. 701/2, 29.1, 36
See application file for complete search history.

(56) References Cited

U.S. PATENT DOCUMENTS

| 6,476,517 | B1 | 11/2002 | Okada |
| 6,744,349 | B1 | 6/2004 | Asakura et al. |
| 2004/0075532 | A1 | 4/2004 | Ueda et al. |
| 2006/0260665 | A1* | 11/2006 | Teshima et al. ............ 135/88.09 |
| 2007/0024121 | A1* | 2/2007 | Teshima et al. ............. 307/10.2 |
| 2007/0120645 | A1* | 5/2007 | Nakashima .................. 340/5.61 |
| 2007/0132553 | A1 | 6/2007 | Nakashima |
| 2007/0216517 | A1* | 9/2007 | Kurpinski et al. .......... 340/5.72 |
| 2011/0057772 | A1* | 3/2011 | Nagao et al. ................ 340/5.61 |

FOREIGN PATENT DOCUMENTS

| JP | 2001-098813 | 4/2001 |
| JP | 2001-140517 | 5/2001 |
| JP | 2003-184379 | 7/2003 |
| JP | 2004-132024 | 4/2004 |
| JP | 2004-132026 | 4/2004 |
| JP | 2004-132028 | 4/2004 |
| JP | 2004-132132 | 4/2004 |
| JP | 2007-146440 | 6/2007 |

OTHER PUBLICATIONS

Office action dated Feb. 7, 2012 in corresponding Japanese Application No. 2010-048050.

* cited by examiner

*Primary Examiner* — Khoi Tran
*Assistant Examiner* — Dale Moyer
(74) *Attorney, Agent, or Firm* — Harness, Dickey & Pierce, PLC (57) ABSTRACT

An automatic locking system for vehicles includes an electronic control unit. If it is determined that an electronic key is not located in a communication area of an inside-cabin transmitter, the control unit determines whether or not the electronic key is located nearby. As a result, if the electronic key is determined as being located nearby, followed later by a determination that the electronic key is not located nearby, comparison history is stored in a memory. If it is determined that comparison history is stored in the memory and four entry-and-exit doors are closed, the four entry-and-exit doors are locked.

7 Claims, 6 Drawing Sheets

METHOD AND SYSTEM FOR AUTOMATICALLY LOCKING DOORS OF VEHICLE

CROSS-REFERENCE TO RELATED APPLICATION

This application is based on and claims the benefit of priority from earlier Japanese Patent Application No. 2010-48050 filed Mar. 4, 2010, the description of which is incorporated herein by reference.

BACKGROUND OF THE INVENTION

1. Technical Field

The present invention relates to an automatic locking system and an automatic locking method for automatically locking the doors of a vehicle.

2. Related Art

Recently, a lot of attention is focused on a so-called automatic locking system for vehicles, which automatically locks the entry-and-exit doors of a vehicle. As an example of this system, the system as described in JP-A-2007-146440 is known. In this system, communication is established with an electronic key in a predetermined communication area around the doors outside the vehicle cabin. In the communication, an ID code included in a signal transmitted from the electronic key is compared with an ID code that has been registered in advance. Further, if the result of the comparison changes from OK to NG (i.e. not OK) in the case where all of the entry-and-exit doors are closed, all of the entry-and-exit doors are locked (e.g., see Patent Document 1).

The system described in JP-A-2007-146440 may not be able to lock the entry-and-exit doors under the conditions where the driver carrying the electronic key leaves the vicinity of the vehicle, a vehicle occupant not carrying the electronic key stays in the vehicle cabin, and the vehicle occupant then gets out of the vehicle and closes an entry-and-exit door. This is because, if the electronic key is located somewhere away from the vicinity of the doors when the vehicle occupant closes the entry-and-exit door, the result of the comparison mentioned above will not change from OK to NG even when all of the entry-and-exit doors are closed.

SUMMARY OF THE INVENTION

Thus, it has been desired to provide an automatic locking system for vehicles, which is able to lock the entry-and-exit doors under the conditions where a person carrying the electronic key leaves from the vicinity of the vehicle, and then another person not carrying the electronic key gets out of the vehicle and closes an entry-and-exit door.

According to an example of the present application, an automatic locking system for vehicles is provided, which includes outside-cabin comparing means that establishes communication with an electronic key in an communication area that is a predetermined range outside a vehicle cabin and compares an ID code included in a signal transmitted from the electronic key with an ID code registered in advance, the system locking all entry-and-exit doors of the vehicle when a comparison result of the outside-cabin comparing means has changed from OK to NG in the case where all of the entry-and-exit doors are closed.

The system comprises comparison history storing means that stores comparison history in a memory when the comparison result of the outside-cabin comparing means has changed from OK to NG in the case where not all of the entry-and-exit doors are closed (i.e. in the case where at least any one of the entry-and-exit doors is open). In the system, all of the entry-and-exit doors are locked if the comparison history has been stored in the memory when all of the entry-and-exit doors are closed. Thus, the comparison history is stored in the memory when the comparison result of the outside-cabin comparing means has changed from OK to NG in the case where not all of the doors are closed. If comparison history is stored when all of the entry-and-exit doors are closed, all of the entry-and-exit doors are ensured to be locked. Therefore, the entry-and-exit doors are locked in such a case as where a person carrying the electronic key has moved away from the predetermined range outside the vehicle cabin, and then a person not carrying the electronic key has exited the vehicle and closed an entry-and-exit door. Preferably, the automatic locking system for vehicles comprises means for clearing the comparison history stored in the memory when predetermined time has expired in a state where not all of the entry-and-exit doors are closed after storage of the comparison history in the memory. Thus, the entry-and-exit doors are prevented from being locked when not intended, with the comparison history remaining stored in the memory.

Further, the automatic locking system for vehicles may comprise inside-cabin comparing means that establishes communication with an electronic key in a communication area that is the inside of a vehicle cabin and compares an ID code included in a signal transmitted from the electronic key with an ID code registered in advance, and the comparison history storing means stores the comparison history in the memory when the comparison result of the inside-cabin comparing means is NG and the comparison result of the outside-cabin comparing means has changed from OK to NG in the case where not all of the entry-and-exit doors are closed. Thus, the electronic key is determined as having moved to the outside of the vehicle cabin from inside the vehicle cabin and then having moved away from the predetermined range outside vehicle cabin to thereby more appropriately store the comparison history in the memory.

Further, the automatic locking system for vehicles described above may be configured to close all of the entry-and-exit doors of the vehicle when a predetermined time has expired, with the comparison result of the outside-cabin comparing means remaining OK, in the case where all of the entry-and-exit doors are closed. Thus, the entry-and-exit doors are also locked in the case where a vehicle occupant carrying the electronic key has got out of the vehicle and then stayed around the vehicle.

BRIEF DESCRIPTION OF THE DRAWINGS

In the accompanying drawings.

DETAILED DESCRIPTION OF PREFERRED EMBODIMENTS

Figure 1:
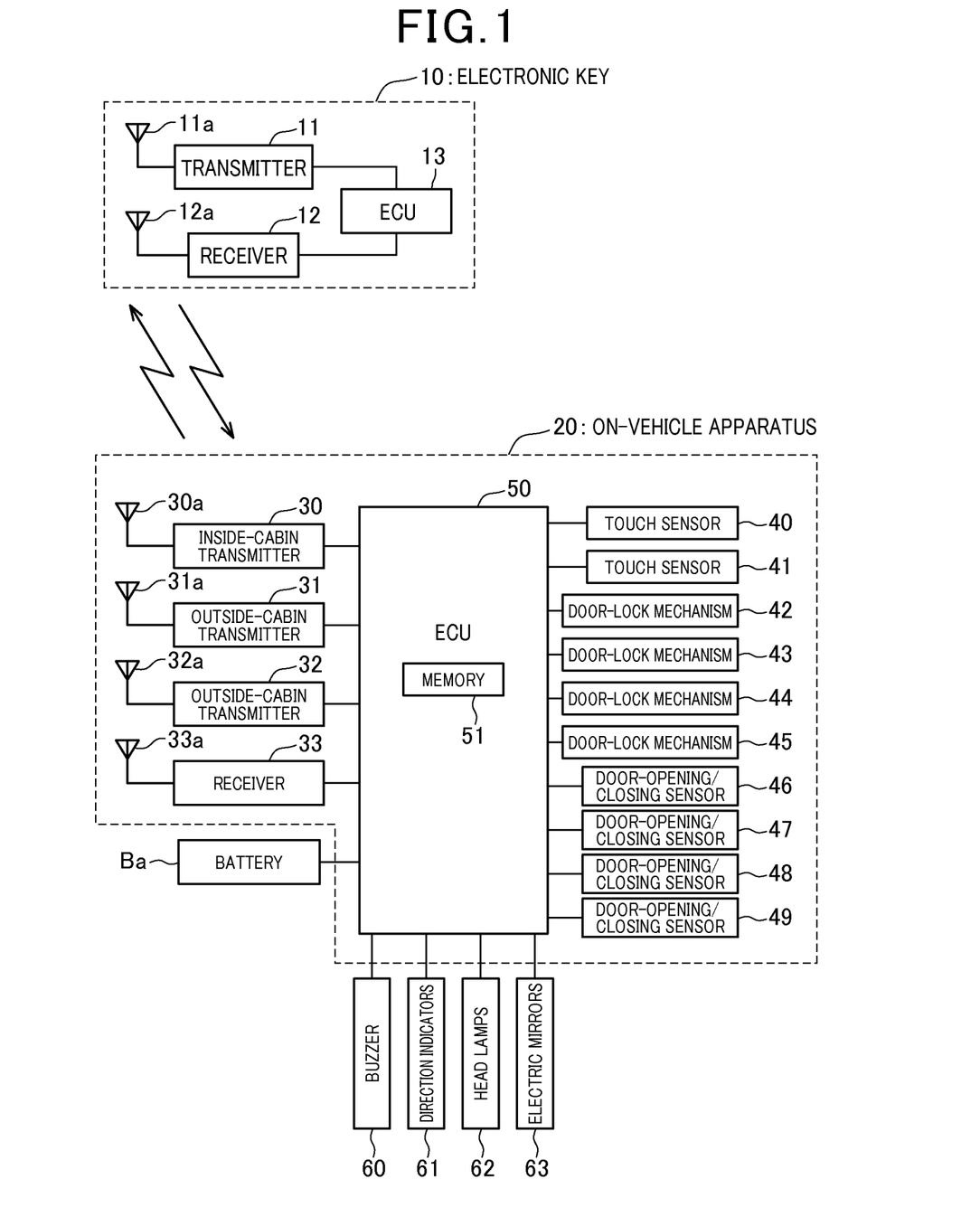
FIG. 1 is a diagram illustrating the configuration of an automatic locking system for vehicles according to an embodiment of the present invention.

With reference to the drawings, hereinafter will be described an embodiment of an automatic locking system for vehicles related to the present invention. FIG. 1 is a block diagram illustrating a schematic configuration of the automatic locking system for vehicles.

The automatic locking system for vehicles is adapted to automatically lock or unlock the entry-and-exit doors of a vehicle. The vehicle of the present embodiment has four entry-and-exit doors which are a driver's seat door (front-right seat door), a passenger's seat door (front-left seat door), a rear-right seat door and a rear-left seat door.

The automatic locking system for vehicles consists of an electronic key 10 and an on-vehicle apparatus 20.

The electronic key 10 includes a transmitter 11, a receiver 12 and an electronic control unit (referred to as "ECU" in the drawings) 13. The transmitter 11 transmits a transmission signal to the on-vehicle system 20 from a transmission antenna 11a. The receiver 12 receives a signal transmitted from the on-vehicle apparatus 20 via a reception antenna 12a. The electronic control unit 13 is configured such as by a memory and a CPU to perform a process of allowing the transmitter 11 to transmit a response signal based on the signal received by the receiver 12. The memory of the electronic control unit 13 is registered (stored) with an identification code (ID code) unique to the vehicle. The on-vehicle apparatus 20 includes an inside-cabin transmitter 30, outside-cabin transmitters 31 and 32, a receiver 33, touch sensors 40 and 41, door-lock mechanisms 42 to 45, door-opening/closing sensors 46 to 49 and an electronic control unit 50.

The inside-cabin transmitter 30 transmits a transmission signal from a transmission antenna 30a into the vehicle cabin to create a communication area inside the vehicle cabin. The outside-cabin transmitter 31 transmits a transmission signal from a transmission antenna 31a to the outside of the vehicle cabin to create a communication area around the driver's seat door in the outside of the vehicle cabin. The outside-cabin transmitter 32 transmits a transmission signal from a transmission antenna 32a to the outside of the vehicle cabin to create a communication area around the passenger's seat door in the outside of the vehicle cabin. The receiver 33 receives a signal from the electronic key 10 using a reception antenna 33a.

The touch sensor 40 is provided at a door handle of the driver's seat door to sense a person's touch on the door handle. The touch sensor 41 is provided at a door handle of the passenger's seat door to sense a person's touch on the door handle.

The door-lock mechanism 42 is configured to unlock or lock the driver's seat door. The door-lock mechanisms 43, 44 and 45 are provided at the passenger's seat door, the rear-right seat door and the rear-left seat door, respectively, to unlock or lock the corresponding doors.

To clarify the correspondency of the door-lock mechanisms 42, 43, 44 and 45, the door-lock mechanism 42 is hereinafter referred to as "driver's seat door-lock mechanism 42". Similarly, the door-lock mechanisms 43, 44 and 45 are referred to as "passenger's seat door-lock mechanism 43", "rear-right seat door-lock mechanism 44" and "rear-left door-lock mechanism 45", respectively.

The door-opening/closing sensor 46 senses whether or not the driver's seat door is closed. A switch is used as the door-opening/closing sensor 46, which is in an on-state when the driver's seat door is closed and is in an off-state when the driver's seat door is opened.

The door-opening/closing sensors 47, 48 and 49 are provided at the passenger's seat door, the rear-right seat door and the rear-left seat door, respectively, to sense whether or not the corresponding entry-and-exit doors are closed. A switch similar to that of the door-opening/closing sensor 46 is used as each of the door-opening/closing sensors 47, 48 and 49.

To clarify the correspondency between the door-opening/closing sensors 46, 47, 48 and 49 and the doors, the door-opening/closing sensor 46 is hereinafter referred to as "driver's seat door-opening/closing sensor 46". Similarly, the door-opening/closing sensors 47, 48 and 49 are referred to as "passenger" seat door-opening/closing sensor 47, "rear-right door-opening/closing sensor 48" and "rear-left door-opening/closing sensor 49", respectively.

The electronic control unit 50, which operates with the supply of power from a battery Ba, includes a memory 51, a timer and a CPU.

The electronic control unit 50 executes the computer programs shown in FIGS. 2A, 3, 4 and 5. In executing the computer programs, the electronic control unit 50 performs a process of controlling the door-lock mechanisms 42 to 45 based on the detection signals such as from the sensors 40, 41 and 46 to 49. In addition to this, the electronic control unit 50 performs a process of controlling direction indicators 61, head lamps 62, a buzzer 62 and electric mirrors 63 in order to give an alarm for avoiding locking of the entry-and-exit doors when the electronic key 10 is located in the vehicle cabin.

Besides the computer programs, the memory 51 stores an identification code of the vehicle. The memory 51 stores data, such as history, which will be described later, with the CPU's execution of a computer program.

The buzzer 60 is provided for outputting an alarm sound around the vehicle. The direction indicators 61 are lights attached to the vehicle body and the door mirrors, for example, to indicate the direction with the flicker of the lights, in which the vehicle advances. The head lamps 62 are lights for emitting light in the forward direction of the vehicle. The electric mirrors 63 are each configured by a door mirror rotatably supported by the vehicle body and an electric motor for rotatably driving the door mirror.

Hereinafter is described an operation of the automatic locking system for vehicles according to the present embodiment.

The electronic control unit 50 performs a door-unlocking process and a door-locking process. Hereinafter, the door-unlocking process and the door-locking process are described in turn.

(Door-Unlocking Process)

Figure 2A:
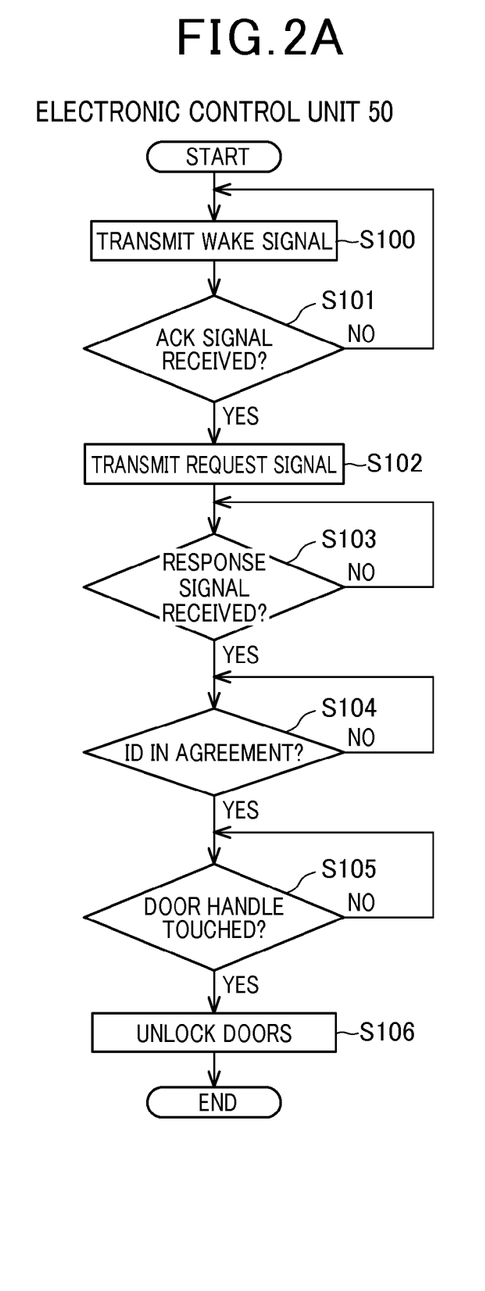
FIGS. 2A and 2B are flow diagrams illustrating a control process of an electronic control unit related to the embodiment.
Figure 2B:
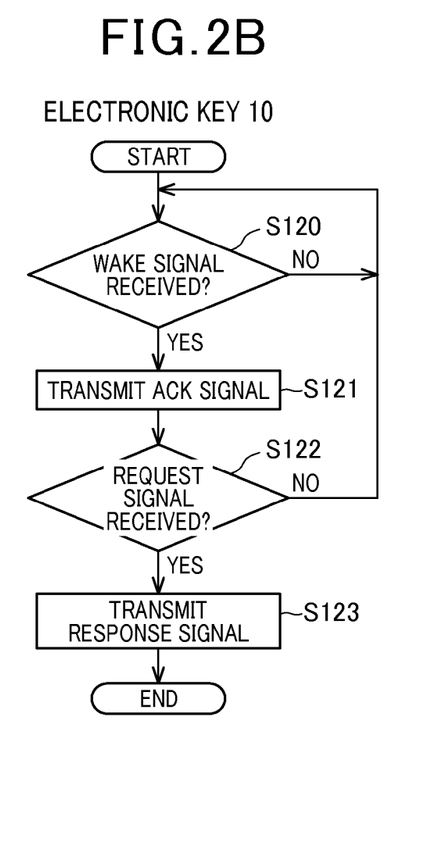

First, the door-unlocking process is described. FIG. 2A is a flow diagram illustrating the door-unlocking process performed by the electronic control unit 50. FIG. 2B is a flow diagram illustrating a response process performed by the electronic control unit 13 of the electronic key 10. The door-unlocking process of the electronic control unit 50 is periodically performed when the four entry-and-exit doors are all locked.

First, at step S100 of FIG. 2A, the electronic control unit 50 allows the outside-cabin transmitters 31 and 32 to transmit a wake signal.

At step S120 of FIG. 2B, the electronic control unit 13 of the electronic key 10 determines whether or not a wake signal (referred to as "wake signal" in the figure) has been received from the outside-cabin transmitters 31 and 32.

Then, when a person carrying the electronic key 10 approaches the driver's seat door, for example, to get into the vehicle, the receiver 12 of the electronic control unit 13 of the electronic key 10 receives a wake signal from the outside-cabin transmitter 31. Then, the electronic control unit 13 makes a YES determination at step S120. Then, the electronic control unit 13 transmits, at step S121, an acknowledgement signal (referred to as "ACK signal" in the figure) from the transmitter 11.

At step S101 of FIG. 2A, the electronic control unit 50 determines whether or not an acknowledgement signal has been received from the electronic key 10. Then, at step S101, upon reception of an acknowledgement signal from the electronic key 10 via the receiver 33, the electronic control unit 50 makes a YES determination. Then, at step S102, the electronic control unit 50 allows the outside-cabin transmitters 31 and 32 to transmit a request signal.

The electronic control unit 13 of the electronic key 10 determines, at step S122 of FIG. 2B, whether or not a request signal has been received. When a request signal is received from the outside-cabin transmitter 31 via the receiver 12, the electronic control unit 13 makes a YES determination at step S122. Then, the electronic control unit 13 transmits, at step S123, a response signal including an identification code from the transmitter 11.

At step S103 of FIG. 2A, the electronic control unit 50 determines whether or not a response signal has been received from the electronic key 10. Upon reception of a response signal from the electronic key 10 via the receiver 33, the electronic control unit 50 makes a YES determination at step S103. Then, the electronic control unit 50 determines, at step S104, whether or not the identification code included in the response signal is in agreement with an identification code stored in advance in the memory 51.

If the identification code included in the response signal is in agreement with the identification code stored in the memory 51 in advance, the electronic control unit 50 makes a YES determination at step S104.

Subsequently, at step S105, the electronic control unit 50 determines whether or not the door handle of either one of the driver's seat door or the passenger's seat door has been touched, based on the detection signals of the touch sensors 40 and 41.

If the door handle of neither of the driver's seat door nor the passenger's seat door has been touched, the electronic control unit 50 makes a NO determination at step S105. After that, a determination at step S105 is repeatedly made until the door handle of either one of the driver's seat door and the passenger's seat door is touched.

For example, if a person touches the door handle of the driver's seat door, the electronic control unit 50 makes a YES determination at step S105. Then, at step S106, the electronic control unit 50 controls the door-lock mechanisms 42, 43, 44 and 45 to unlock all of the four entry-and-exit doors.

At step S101 mentioned above, after transmitting a wake signal, the electronic control unit 50 may not receive an acknowledgement signal from the electronic key 10. In such a case, the electronic control unit 50 makes a NO determination at step S101. In this case, it is determined that no communication is established between the electronic control unit 50 and the electronic key 10, and control returns to step S100.

(Door-Locking Process)

Figure 3:
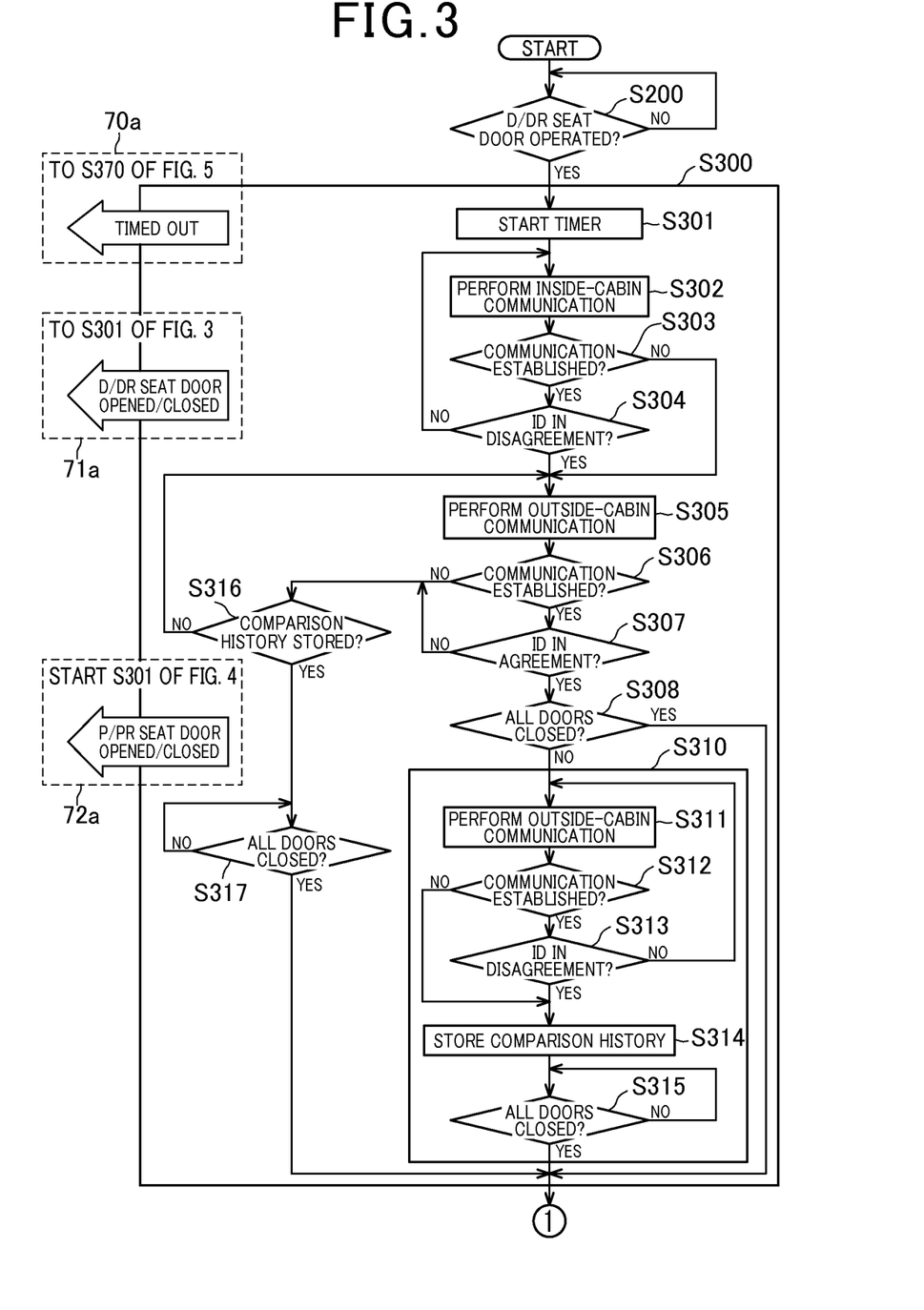
FIG. 3 is another flow diagram illustrating a control process of the electronic control unit related to the embodiment.
Figure 4:
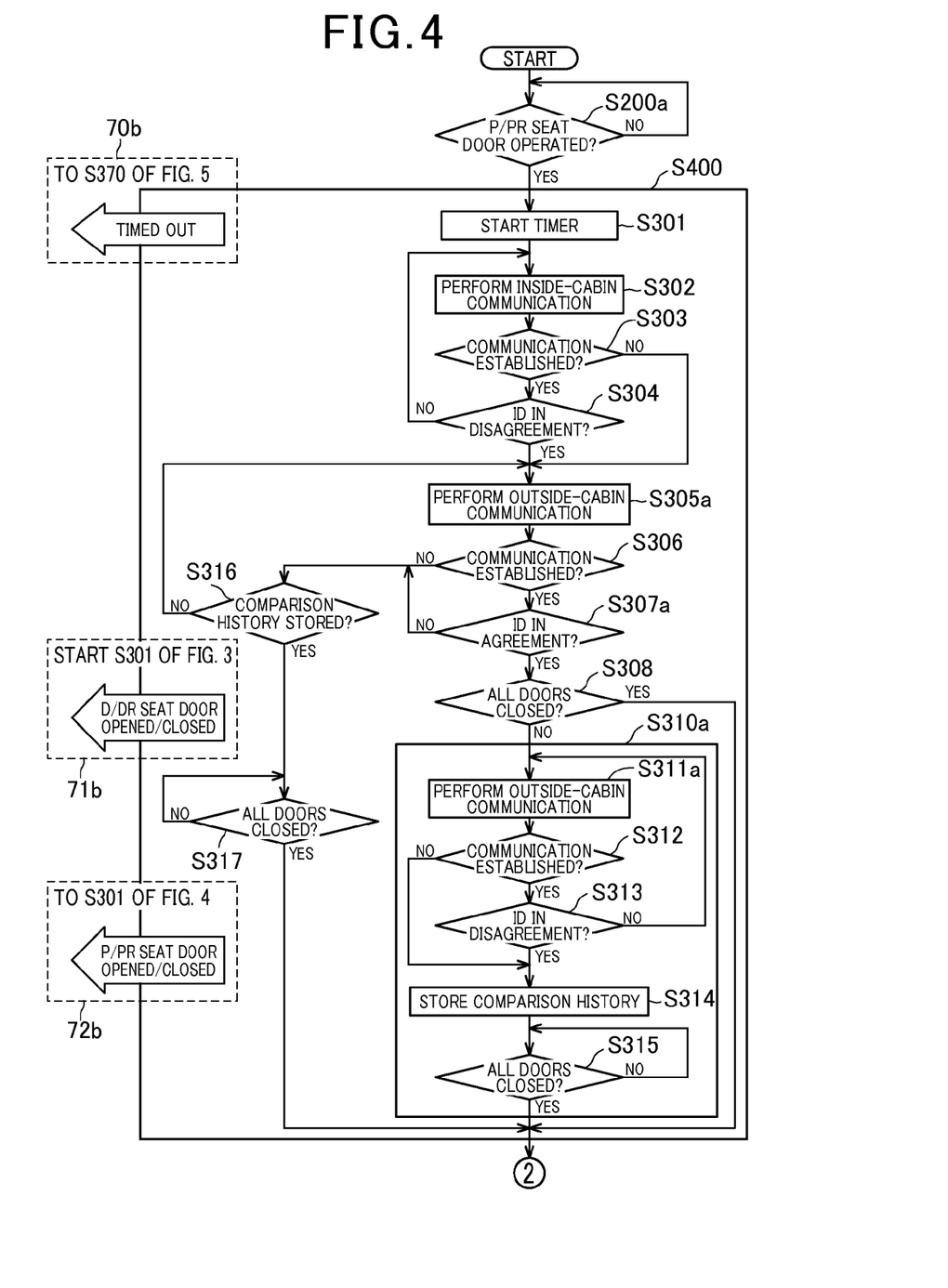
FIG. 4 is another flow diagram illustrating a control process of the electronic control unit related to the embodiment.
Figure 5:
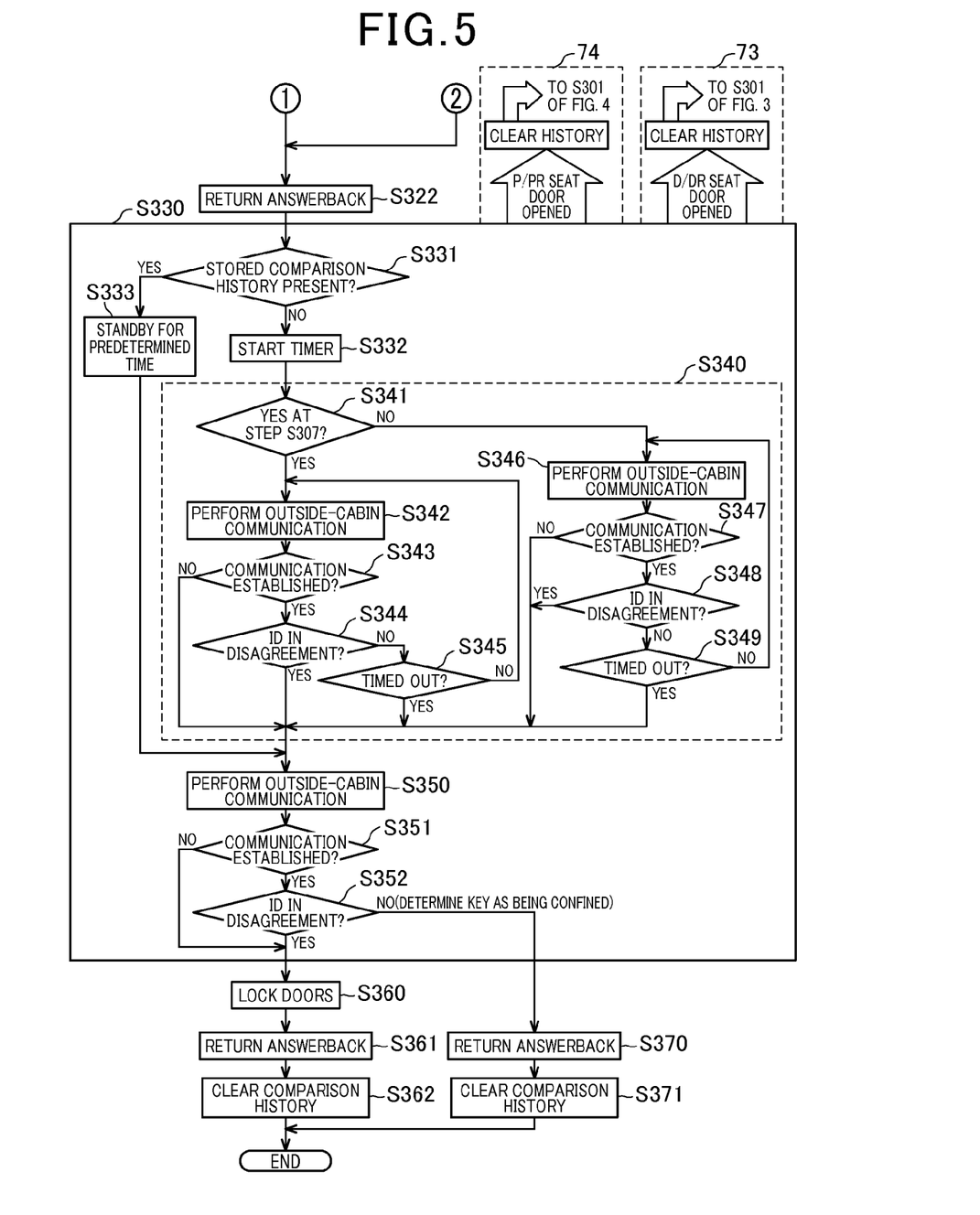
FIG. 5 is another flow diagram illustrating a control process of the electronic control unit related to the embodiment.

Referring now to FIGS. 3, 4 and 5, hereinafter is described the door-locking process.

The door-locking process includes a driver's seat side detection process, a passenger's seat side detection process and a lock control process.

The driver's seat side detection process includes step S200 and step S300 (range enclosed by the solid line in the figure) of FIG. 3. The passenger's seat side detection process includes step S200a and step S400 (range enclosed by the solid line in the figure) of FIG. 4. The driver's seat side detection process and the passenger's seat side detection process are performed for detecting the location of the electronic key 10. The lock control process includes step S322 and step S330 (range enclosed by the solid line in the figure) and steps S360 to S362 and S370 to S371 of FIG. 5.

The driver's seat side detection process and the passenger's seat side detection process are alternately performed in a time-sharing manner. The lock control process is performed after finishing the performance of the driver's seat side detection process and the passenger's seat side detection process. Hereinafter, the driver's seat side detection process, the passenger's seat side detection process and the lock control process are described in turn.

(Driver's Seat Side Detection Process)

First, at step S200 of FIG. 3, it is determined whether or not an opening/closing operation has been performed for the driver's seat door (D-seat door) or the rear-right seat door (DR-seat door), based on a signal output of the driver's seat door opening/closing sensor 46 and a signal output of the rear-right seat door opening/closing sensor 48.

When the driver's seat door and the rear-right seat door maintain a closed state, or when the driver's seat door and the rear-right seat door maintain an opened state, a NO determination is made at step S200 and control returns to step S200.

If any one of the following actions is performed a YES determination is made at step S200, that is: opening of the driver's seat door; closing of the driver's seat door, opening of the rear-right seat door; and closing of the rear-right seat door. Then, control proceeds to step S300. At step S300, a process of detecting the location of the electronic key 10 is performed based on the communication of the transmitters 30 and 31 with the electronic key 10. If the driver's seat door or the rear-right seat door is closed during the execution of step S300, a process for the control to return to step S301 is performed (see reference 71a of FIG. 3).

At step S300, the timer starts a count, first, at step S301.

At the subsequent step S302, communication is started between the inside-cabin transmitter 30 and the electronic key 10. The process at step S302 is similar to that of step S100 of FIG. 2A except that the inside-cabin transmitter 30 is used instead of the outside-cabin transmitters 31 and 32. Accordingly, when an acknowledgement signal is received from the electronic key 10 after transmission of a wake signal at step S302, a YES determination is made at step S303, i.e. a determination that communication is established between the inside-cabin transmitter 30 and the electronic key 10.

After that, at step S304, similar to steps S102 and S103 of FIG. 2A, communication is achieved between the inside-cabin transmitter 30 and the electronic key 10, followed by a determination as to whether an identification code included in the response signal from the electronic key 10 is in disagreement with the identification code stored in advance in the memory 51.

When the identification code included in the response signal is in agreement with the identification code stored in advance in the memory 51, a NO determination is made at step S304. In other words, it is determined that the electronic key 10 is located in the vehicle cabin. Specifically, an OK determination is made regarding the inside-cabin comparison. In this case, control returns to step S302.

Then, as far as the electronic key 10 is located in the communication area of the inside-cabin transmitter 30, step S302, a YES determination at step S303 and a NO determination at step 304 are repeated.

After that, if a person gets out of the vehicle, carrying the electronic key 10, no acknowledgement signal will be received from the electronic key 10 after the execution of the process at step S302. Therefore, a NO determination is made at step S303, i.e. a determination that communication is not established between the inside-cabin transmitter 30 and the electronic key 10. In other words, since the electronic key 10 is not located in the communication area of the inside-cabin transmitter 30, an NG determination is made regarding the inside-cabin comparison. In this case, control proceeds to step S305.

Further, at step S304 mentioned above, if the identification code included in a response signal from the electronic key 10 is in disagreement with the identification code stored in advance in the memory 51, a YES determination is made. This means that communication has been established between an electronic key other than the electronic key 10 for the vehicle and the inside-cabin transmitter 30. In this case as well, an NG determination is made regarding the inside-cabin comparison.

At the subsequent step S305, communication is started between the outside-cabin transmitter 31 and the electronic key 10. Step S305 is similar to step S302 mentioned above except that the outside-cabin transmitter 31 is used instead of the inside-cabin transmitter 30. Then, at the subsequent step S306, it is determined whether or not communication has been established between the outside-cabin transmitter 31 and the electronic key 10.

When an acknowledgement signal is received from the electronic key 10 after executing the process at step S305, a YES determination is made based on the establishment of communication between the outside-cabin transmitter 31 and the electronic key 10.

After that, at step S307, communication is achieved between the outside-cabin transmitter 31 and the electronic key 10 similar to step S304 mentioned above, followed by a determination as to whether or not an identification code included in the response signal from the electronic key 10 is in agreement with the identification code stored in advance in the memory 51.

When the identification code included in the response signal is in agreement with the identification code stored in advance in the memory 51, a YES determination is made at step S307. In other words, it is determined that the electronic key 10 is located in the communication area of the outside-cabin transmitter 31. Specifically, an OK determination is made regarding the outside-cabin comparison. This means that the electronic key 10 is determined as having moved to the communication area of the outside-cabin transmitter 31 from inside the vehicle cabin.

At the subsequent step S308, it is determined whether or not the four entry-and-exit doors are all closed, based on the output signals from the door opening/closing sensors 46, 47, 48 and 49.

If the four entry-and-exit doors are all closed, a YES determination is made at step S308, and control proceeds to step S322 of FIG. 5.

If at least one of the four entry-and-exit doors is opened, a NO determination is made at step S308 and control proceeds to step S310. At step S310, a process is performed for storing history which indicates that the electronic key 10 has moved out of the communication area of the outside-cabin transmitter 31 and has moved away from the vehicle, i.e. comparison history indicating that the outside-cabin comparison has changed from OK to NG.

Specifically, at step S311 of step S310, communication is started between the outside-cabin transmitter 31 and the electronic key 10, similar to step S305 mentioned above. At the subsequent step S312, it is determined, similar to step S306 mentioned above, as to whether or not communication is established between the outside-cabin transmitter 31 and the electronic key 10.

In this case, at step S312, a YES determination is made if communication is established between the outside-cabin transmitter 31 and the electronic key 10. At the subsequent step S313, communication is achieved between the outside-cabin transmitter 31 and the electronic key 10, similar to step S307 mentioned above, followed by a determination as to whether or not the identification code included in a response signal from the electronic key 10 is in disagreement with the identification code stored in advance in the memory 51. If the identification code included in the response signal from the electronic key 10 is in agreement with the identification code stored in advance in the memory 51, a NO determination is made at step S313 and control returns to step S311.

At step S312, if the electronic key 10 has moved out of the communication area of the outside-cabin 31 and has moved to a location away from the vehicle, a NO determination is made, i.e. a determination that communication is not established between the outside-cabin transmitter 31 and the electronic key 10. In other words, it is determined, at step S312, that the electronic key 10 for the vehicle of the present embodiment is not located in the communication area of the outside-cabin transmitter 31. In this case, control proceeds to step S314.

When the identification code included in the response signal from the electronic key 10 is in disagreement with the identification code stored in advance in the memory 51, a YES determination is made at step S313. This means that a different electronic key other than the electronic key 10 for the vehicle of the present embodiment has communicated with the outside-cabin transmitter 31, in the communication area of the outside-cabin transmitter 31. In other words, it is determined, at step S313, that the electronic key 10 for the vehicle of the present embodiment is not located in the communication area of the outside-cabin transmitter 31. In this case as well, control proceeds to step S314.

If a NO determination is made at step S312, or if a YES determination is made at step 312, followed by a YES determination at step S313, comparison history is stored, at the subsequent step S314, in the memory 51 based on the change of the outside-cabin comparison from OK to NG.

Then, at step S315, it is determined whether or not the four entry-and-exit doors are all closed, based on the output signals of the door opening/closing sensors 46, 47, 48 and 49. If at least one of the four entry-and-exit doors is opened, a NO determination is made at step S315. Then, the determination process at step S315 is repeated until the four entry-and-exit doors are all closed.

In the repetition of the process, control returns to step S301 when, for example, the driver's seat door or the rear-right seat door is closed (see reference 71a of FIG. 3).

In this case, control proceeds to step S316 in the case where the inside-cabin comparison is NG and a NO determination is made at step S306 following the execution of the process of step S305, or in the case where the determination at step S306 is YES and the determination at step S307 is NO, i.e. the outside-cabin comparison is NG. Then, at step S316, it is determined whether or not comparison history is stored in the memory 51.

If comparison history is stored in the memory 51, it is determined, at the subsequent step S317, whether or not the four entry-and-exit doors are all closed, based on the output signals from the door opening/closing sensors 46, 47, 48 and 49. If the four entry-and-exit doors are all closed, a YES determination is made at step S317, and then control proceeds to step S322 of FIG. 5.

If at least one of the four entry-and-exit doors is opened, a NO determination is made at step S317, and control returns to step S317. Thus, a NO determination is repeated at step S317 until the four entry-and-exit doors are all closed.

During the execution of such a step S300, when the time counted by the timer has become equal to or more than a predetermined time, the process of step S300 is interrupted as being timed out (see reference 70a in the figure). Then, control proceeds to step S370 of FIG. 5. At step S370, an answerback process is performed to inform the vehicle's surrounding area of the interruption of the process at step S300.

For example, the direction indicators 61 and the head lamps 62 are flickered, an alarm is raised by the buzzer 60, or the electric motors of the electric mirrors 63 are controlled to rotate the respective door mirrors such that the mirrors are substantially become parallel to the longitudinal direction of the vehicle. After that, at step S317 of FIG. 5, the comparison history is cleared from the memory 51.

During the execution of step S300, any one of the following actions may be performed, that is: opening of the passenger's seat door; closing of the passenger's seat door; opening of the rear-left seat door; and closing of the rear-left seat door. In such a case, while step S300 is continuously executed, step S301 of step S400 of FIG. 4 is started (see reference 72a of FIG. 3). In starting step S301 of step S400 of FIG. 4, if step S400 has already been under execution, the process at step S400 under execution is interrupted to start step S301.

(Passenger's Seat Side Detection Process)

At step S200a of FIG. 4, it is determined whether or not an opening/closing operation has been performed for the passenger's seat door (P-seat door) or the rear-left seat door (PR-seat door), based on a signal output of the passenger's seat door opening/closing sensor 47 and a signal output of the rear-left seat door opening/closing sensor 49.

When the passenger's seat door and the rear-left seat door maintain a closed state, or when the passenger's seat door and the rear-left seat door maintain an opened state, a NO determination is made at step S200a and control returns to step S200a.

If any one of the following actions is performed, a YES determination is made at step S200a, that is: opening of the passenger's seat door; closing of the passenger's seat door, opening of the rear-left seat door; and closing of the rear-left seat door. Then, control proceeds to step S400.

At step S400, a process of detecting the electronic key 10 is performed, which is similar to step S300 of FIG. 3 except that the outside-cabin transmitter 32 is used, instead of the outside-cabin transmitter 31, in establishing communication with the electronic key 10.

At step S400, those steps which are similar to those of step S300 of FIG. 3, are similarly performed or substantially similarly performed. Step S305a of step S400 corresponds to step S305 of step S300. At step S305a, communication is established between the outside-cabin transmitter 32, instead of the outside-cabin transmitter 31, and the electronic key 10.

Step S310a of step S400 corresponds to step S310 of step S300 of FIG. 3. Step S311a of step S310a corresponds to step S311 of step S310 of FIG. 3. At step S311a, communication is established between the outside-cabin transmitter 32, instead of the outside-cabin transmitter 31, and the electronic key 10.

Prior to proceeding to step S314 of step S310a of FIG. 4, if comparison history has been stored in the memory 51 at step 314 of step S310 of FIG. 3, the comparison history is overwritten in the memory 51 at step S314 of step S310a of FIG. 4.

During the execution of step S400, when the time counted by the timer has become equal to or more than a predetermined time, the process at step S400 is interrupted, similar to step S300, as being timed out (see reference 70b of FIG. 4). Then, control proceeds to step S370 of FIG. 5 to perform the answerback process, thereby informing the vehicle's surrounding area of the interruption of the process at step S400.

When any one of the following actions is taken during the execution of step S400, that is: opening of the passenger's seat door; closing of the passenger's seat door, opening of the rear-left seat door, and closing of the real-left seat door, the execution of step S400 is interrupted. Then, control returns to step S301 of FIG. 4 (see preference 72b of FIG. 4).

When any one of the following actions is taken during the execution of step S400, that is: opening of the driver's seat door; closing of the driver's seat door; opening of the rear-right seat door; and closing of the rear-right seat door, the process of step S301 of step S300 shown in FIG. 3 is started (see reference 71b of FIG. 4), while step S400 is continuously performed. If step S300 has already been under execution in starting step S301 of FIG. 3, the process of step S300 already been under execution is interrupted to start step S301.

After finishing the processes of steps S400 and S300, the lock control process as shown in FIG. 5 is started. Hereinafter, the lock control process is described referring to FIG. 5.

(Lock Control Process)

First, at step 322 of FIG. 5, an answerback process similar to the one at step 370 as mentioned above is performed. After that, the process of step S330 is performed.

Specifically, at step S331, it is determined whether or not comparison history is stored in the memory 51. If comparison history is stored in the memory 51, a YES determination is made at step S331. Then, at the subsequent step S333, control stands by for a predetermined time and then proceeds to step S350. The standby time is given to provide an extra time in case something is left in the vehicle cabin and the entry-and-exit doors have to be opened to take out the things left before the entry-and-exit doors are locked.

At the subsequent step S350, similar to step S302 of FIG. 3, communication is started between the inside-cabin transmitter 30 and the electronic key 10. At the subsequent step S351, similar to step S303 mentioned above, it is determined whether or not communication has been established between the inside-cabin transmitter 30 and the electronic key 10.

If communication is not established between the inside-cabin transmitter 30 and the electronic key 10, a NO determination is made at step S351 and control proceeds to step S360.

If communication is established between the inside-cabin transmitter 30 and the electronic key 10, a YES determination is made at step S351 and then control proceeds to step S352. Here, similar to step S304 mentioned above, communication is achieved between the inside-cabin transmitter 30 and the electronic key 10 to determine whether or not the identification code included in a response signal from the electronic key 10 is in disagreement with the identification code stored in advance in the memory 51.

If the identification code included in the response signal from the electronic key 10 is in disagreement with the identification code stored in advance in the memory 51, a YES determination is made at step S352, i.e. a determination that the electronic key 10 for the vehicle is not located in the vehicle cabin. Then, control proceeds to step S360.

Specifically, at steps S350 to S352 described above, it is determined whether or not the electronic key 10 is located in the vehicle cabin, i.e. whether or not inside-cabin comparison is NG.

If the inside-cabin comparison has resulted in NG, the door-lock mechanisms 42, 43, 44 and 45 are controlled, at the subsequent step S360, to lock the four entry-and-exit doors. Then, at step S361, an answerback process is performed in order to inform the persons around the vehicle of the fact that the four entry-and-exit doors have been locked. The answerback process at step S361 is similar to the answerback process at step S370. Then, the comparison history of the memory 51 is cleared at step S362.

At step S352 mentioned above, if the identification included in the response signal from the electronic key 10 is in agreement with the identification code stored in advance in the memory 51, a NO determination is made. Specifically, this means that the electronic key 10 has been confined in the vehicle cabin.

In this case, control proceeds to step S370 to perform the answerback process mentioned above, so that the persons around the vehicle are informed of the fact that the electronic key 10 has been confined in the vehicle cabin. Thus, in the event the electronic key 10 is located in the vehicle cabin, an alarm is raised outside the vehicle to prevent the entry-and-exit doors from being locked. Then, at step S371, the comparison history of the memory 51 is cleared.

At step S331 mentioned above, if comparison history has not been stored in the memory 51, a NO determination is made. This means that the electronic key 10 is located in the communication area of the outside-cabin transmitter 31 or the outside-cabin transmitter 32, with the four entry-and-exit doors all being closed. In this case, the count of the timer is restarted at the subsequent step S332. The timer counts time that has elapsed after starting the process of step S340. At step S340, it is determined whether or not the electronic key 10 has been continuously located in the communication area of the outside-cabin transmitter 31 or the outside-cabin transmitter 32 for not less than a predetermined time period.

Specifically, at the subsequent step S341, it is determined whether or not a YES determination has been made at step S307 of FIG. 3. If a YES determination has been made at step S307 of FIG. 3, a YES determination is made at step S341, i.e. a determination that the electronic key 10 has been located in the communication area of the outside-cabin transmitter 31 and the outside-cabin comparison has turned out to be OK.

At the subsequent step S342, similar to step S305 of FIG. 3, communication is started between the outside-cabin transmitter 31 and the electronic key 10. Then, at the subsequent step S343, it is determined whether or not communication is established between the outside-cabin transmitter 31 and the electronic key 10.

In this case, if communication is established between the outside-cabin transmitter 31 and the electronic key 10, a YES determination is made at step S343 and then control proceeds to step S344. Then, similar to step S307 of FIG. 3, communication is achieved between the outside-cabin transmitter 31 and the electronic key 10 to determine whether or not the identification code included in a response signal from the electronic key 10 is in disagreement with the identification code stored in advance in the memory 51.

If the identification code included in the response signal is in disagreement with the identification code stored in advance in the memory 51, a YES determination is made at step S344. Specifically, it is determined that the outside-cabin comparison has changed from OK to NG. In this case, control proceeds to step S350.

At step S344 mentioned above, if it is determined that the identification code included in the response signal is in agreement with the identification code stored in advance in the memory 51, a NO determination is made. Specifically, this determination means that the electronic key 10 is located in the communication area of the outside-cabin transmitter 31. In this case, control proceeds to step S345 to determine whether or not the time measured by the timer that has started a count at step S332 mentioned above has become equal to or more than a predetermined time (i.e. whether or not the measured time has been timed out). If the measured time of the timer is less than the predetermined time, a NO determination is made at step S345 and control returns to step S342.

Thus, as far as the electronic key 10 is located in the communication area of the outside-cabin transmitter 31 and the time measured by the timer is less than the predetermined time, step S342, a YES determination at step S343, a NO determination at step S344 and a NO determination at step 345 are repeated. Then, when the electronic key 10 has moved out of the communication area of the outside-cabin transmitter 31, a NO determination is made at step S343. Then, control proceeds to step S350.

If the electronic key 10 is continuously located in the communication area of the outside-cabin transmitter 31 until the time measured by the timer becomes equal to or more than the predetermined time, a YES determination is made at step S345, i.e. a determination that the measured time has been timed out. Then, control proceeds to step S350 and the subsequent steps. Thus, when a vehicle occupant carrying the electronic key 10 has got out of the vehicle and stayed around the vehicle, the doors are locked after expiration of the predetermined time.

At step S341 mentioned above, a NO determination is made if a YES determination has not been made at step S307 of FIG. 3. Specifically, if a YES determination has been made at step S307a of FIG. 4 and control has proceeded to step S322 and the subsequent steps of FIG. 5, it is determined that the electronic key 10 is located in the communication area of the outside-cabin transmitter 32 and that the outside-cabin comparison has turned out to be OK. After that, the processes at steps S346, S347, S348 and S349 are preformed.

Steps S346, S347, S348 and S349 are similar to steps S342, S343, S344 and S345, respectively, except that the outside-cabin transmitter 32 is used instead of the outside-cabin transmitter 31, in performing communication with the electronic key 10.

Step S346 corresponds to step S342, step S347 corresponds to step S343, step S348 corresponds to step S344 and step S349 corresponds to step S345.

Through the execution of steps S346 to S349, if the electronic key 10 is continuously located in the communication area of the outside-cabin transmitter 32 until the time measured by the timer becomes equal to or more than the predetermined time, a YES determination is made at step S349, i.e. a determination that the time measured by the timer has been timed out. Then, control proceeds to step S350 and the subsequent steps. If the electronic key 10 has moved out of the communication area of the outside-cabin transmitter 32, a NO determination is made at step S348 and then control proceeds to step S350 and the subsequent steps. Thus, when a vehicle occupant carrying the electronic key 10 has got out of the vehicle and then stayed around the vehicle, the doors are locked after expiration of the predetermined time.

Hereinafter are explained Specific Examples 1 to 5 of the door locking process.

SPECIFIC EXAMPLE 1

First, an explanation is given taking as an example the case where a driver gets off the vehicle, carrying the electronic key 10.

When the driver opens the driver's seat door, a YES determination is made at step S200 of FIG. 3. When the driver moves to the communication area of the outside-cabin transmitter 31 from inside the vehicle cabin, processes of steps S301 and S302 of step S300 are performed, followed by step S303 where a NO determination is made, i.e. a determination that no communication is established between the inside-cabin transmitter 30 and the electronic key 10. Further, at step S305, communication is achieved between the outside-cabin transmitter 31 and the electronic key 10, followed by step S306 where a YES determination is made. Then, at step S307, a YES determination is made.

After that, when the driver's seat door is closed (see reference 71a of FIG. 3), the process of step S300 is interrupted and control returns to step S301 of step S300.

In this case, if the driver stays in the communication area of the outside-cabin transmitter 31, carrying the electronic key 10, steps S301 and S302, a NO determination at step S303, step S305, a YES determination at step S306 and a YES determination at step S307 are performed. In this case, if the four entry-and-exit doors are all closed, a YES determination is made at the subsequent step S308.

If the passenger's seat door and the rear-left seat door remain being closed after the driver has opened the driver's seat door as mentioned above, a NO determination is made at step S200a of FIG. 4. Therefore, step S400 of FIG. 4 is not performed. Accordingly, after making a YES determination at step S308 mentioned above, the process of step S322 of FIG. 5 is performed and then control proceeds to step S330.

At step S331 of step S330, a NO determination is made, i.e. a determination that no comparison history is stored, followed by the process of step S332. Then, control proceeds to step S341. At step S341, a YES determination is made, i.e. a determination that a YES determination has been made at step S307 mentioned above.

If the vehicle occupant has moved out of the communication area of the outside-cabin transmitter 31, carrying the electronic key 10, a NO determination is made at step S344. After that, through the process at step S350 and a NO determination at step S351, the door locking process is performed at step S360. In this way, the four entry-and-exit doors are locked.

SPECIFIC EXAMPLE 2

Specific Example 1 explained above has dealt with the case where a vehicle occupant carrying the electronic key 10 gets out of the vehicle, closes the driver's seat door and then moves out of the communication area of the outside-cabin transmitter 31. Instead, another example is explained here in which a vehicle occupant carrying the electronic key 10 gets off the vehicle and moves out of the communication area of the outside-cabin transmitter 31, and then another vehicle occupant without carrying the electronic key 10 closes the driver's seat door.

First, the vehicle occupant carrying the electronic key 10 opens the driver's seat door and moves to the communication area of the outside-cabin transmitter 31 from inside the vehicle cabin.

In this case, similar to the Specific Example 1 explained above, such steps are sequentially performed as a YES determination at step S200 of FIG. 3, steps S301 and S302, a NO determination at step S303, step S305, a YES determination at step S306 and a YES determination at step S307. In this case, if the driver's seat door is open, a NO determination is made at step S308.

Then, when the vehicle occupant carrying the electronic key 10 moves out of the communication area of the outside-cabin transmitter 31, step S311 is performed and then a NO determination is made at step S312, followed by storing the comparison history in the memory 51 at step S314. Then, if another vehicle occupant without carrying the electronic key 10 closes the driver's seat door, the process of step S300 is interrupted and control returns to step 301. Then, such steps are sequentially performed as steps S301 and S302, a NO determination at step S303 and step S305. After that, at step S306, a NO determination is made, i.e. a determination that no communication is established between the outside-cabin transmitter 31 and the electronic key 10.

Then, at step S316, a YES determination is made, i.e. a determination that comparison history has been stored. Then, at step S317, a YES determination is made, i.e. a determination that the four entry-and-exit doors are all closed.

Then, such steps are sequentially performed as step S322, a YES determination at step S331, steps S333 and S350 and a NO determination at step S351. Then, at step S360, the door locking process is performed. In this way, the four entry-and-exit doors are locked.

SPECIFIC EXAMPLE 3

Hereinafter is explained an example in which a driver carrying the electronic key 10 opens the driver's seat door and gets out of the vehicle, and then a vehicle occupant not carrying the electronic key 10 opens the passenger's seat door and gets off the vehicle.

First, when the driver opens the driver's seat door, a YES determination is made at step S200 to start the process of step S300. After that, when the vehicle occupant opens the passenger's seat door, a YES determination is made at step S200a of FIG. 4 to start the process of step S400. Hereinafter is explained the process of step S300 in the case where the driver's seat door and the passenger's seat door are both opened.

First, the vehicle occupant carrying the electronic key 10 moves into the communication area of the outside-cabin transmitter 31 from inside the vehicle cabin.

In this case, similar to the Specific Example 2 explained above, such steps of FIG. 3 are sequentially performed as a YES determination at step S200, steps 301 and S302, a NO determination at step S303, step S305, a YES determination at step S306, a YES determination at step S307 and a NO determination at step S308.

When the driver carrying the electronic key 10 moves away from the communication area of the outside-cabin transmitter 31, the process of step S311 is performed and then a NO determination is made at step S312, followed by storing the comparison history in the memory 51 at step S314.

After that, when the driver's seat door is closed, the process of step S300 is interrupted. Then, control returns to step S301. Then, such steps are sequentially performed as steps S301 and S302, a NO determination at step S303, step S305, a NO determination at step S306 and a YES determination at step S316. Until all of the four entry-and-exit doors are closed, a NO determination is repeatedly made at the subsequent step S317. Then, when the passenger's seat door is closed, meaning that all of the four entry-and exit doors are closed, a YES determination is made at step S317.

When the vehicle occupant opens the passenger's seat door in getting off the vehicle, a YES determination is made at step S200a of FIG. 4. Then, such steps are sequentially performed as steps S301 and S302, a NO determination at step S303, step S305a and a NO determination at step S306. Then, control proceeds to step S316.

As explained above, a YES determination is made at step S316, i.e. a determination that comparison history has been stored in the memory 51 at step S314 of FIG. 3. After that, a NO determination is repeatedly made at step S317 until all of the four entry-and-exit doors are closed. Then, when the passenger' seat door is closed, control returns to step S301 of step S400.

After that, when the four entry-and-exit doors remain being closed, such steps are sequentially performed as steps S301 and S302, a NO determination at step S303, step 305a, a NO determination at step S306 and a YES determination at step S316. Then, a YES determination is made at step S317.

Thus, when a YES determination is made at step S317 of FIG. 3 and when a YES determination is made at step S317 of FIG. 4, control proceeds to step S322 of FIG. 5. The subsequent processes are performed in the same way as in the Specific Example 2. In this way, the four entry-and-exit doors are locked.

SPECIFIC EXAMPLE 4

Hereinafter is explained an example in which a vehicle occupant carrying the electronic key 10 gets out of the vehicle, once closes the driver's seat door, opens and closes the driver's seat door, and then moves away from the vehicle.

First, when the vehicle occupant opens the driver's seat door and moves out of the vehicle cabin into the communication area of the outside-cabin transmitter 31, a YES determination is made at step S200 of FIG. 3, followed by steps S301 and S302 and a NO determination at step S303 in the process of step S300. Further, after performing step S305 and making a YES determination at step S306, a YES determination is made at step S207.

Then, when the driver's seat door is closed, the process of step S300 is interrupted, and control returns to step S301 to start the processes of step 301 and the subsequent steps.

After that, when the vehicle occupant again opens the driver's seat door, control again returns to step S301 to start the processes of the subsequent steps. Then, when the vehicle occupant again closes the driver's seat door, control again returns to step S301. After that, when the four entry-and-exit doors are closed and the vehicle occupant moves away from the vehicle, the subsequent steps are performed in the same way as in the Specific Example 1 explained above. In this way, the four entry-and-exit doors are locked.

SPECIFIC EXAMPLE 5

Hereinafter is explained an example in which a vehicle occupant carrying the electronic key 10 gets off the vehicle and stays around the vehicle.

First, the vehicle occupant opens the driver's seat door and moves out of the vehicle cabin into the communication area of the outside-cabin transmitter 31. In this case, a YES determination is made at step S200 of FIG. 3, followed by steps S301 and S302 and a NO determination at step S303 in the process of step S300. Further, after performing steps S305 and making a YES determination at step S306, a YES determination is made at step S307.

After that, when the driver's seat door is closed, control returns to step S301. In this case, if the vehicle occupant who carries the electronic key 10 stays in the communication area of the outside-cabin transmitter 31, such steps are sequentially performed as steps S301 and S302, a NO determination at step S303, step S305, a YES determination at step S306 and a YES determination at step S307.

After that, if the vehicle occupant carrying the electronic key 10 stays in the communication area of the outside-cabin transmitter 31, with all of the four entry-and-exit doors being closed, a YES determination is made at step S308.

Then, after performing the process of step S322 of FIG. 5, control proceeds to step S331. At step 331, a NO determination is made, i.e. a determination that no comparison history is stored. Then, after performing the process of step S332, control proceeds to step S341.

At step S341, it is determined whether or not a YES determination has been made at step S307. Specifically, it is determined whether or not the electronic key 10 has been located in the communication area of the outside-cabin transmitter 31. Then, a YES determination is made at step S341, i.e. a determination that a YES determination has been made at step S307 mentioned above.

After that, if the vehicle occupant, carrying the electronic key 10, stays in the communication area of the outside-cabin transmitter 31, such steps are sequentially performed as step S342, a YES determination at step S343 and a NO determination at step S344, followed by a NO determination at step S345, which are repeated until when the time measured by the timer becomes equal to or more than a predetermined time (until when the measured time is timed out).

Then, when the time measured by the timer becomes equal to or more than the predetermined time, a YES determination is made at step S345. Since the vehicle occupant, carrying the electronic key 10, stays in the communication area of the outside-cabin transmitter 31 for not less than the predetermined time, it is determined that the vehicle occupant has no intention of returning to the vehicle cabin. Then, the processes of step S350 and the subsequent steps are performed in the same way as in the Specific Example 1. Thus, the four entry-and-exit doors are locked.

SPECIFIC EXAMPLE 6

Hereinafter is explained an example in which a driver carrying the electronic key 10 and a vehicle occupant without carrying the electronic key 10 get out of the vehicle and stay around of the vehicle.

First, the driver opens the driver's seat door and moves out of the vehicle cabin into the communication area of the outside-cabin transmitter 31. In this case, similar to the Specific Example 5, the processes of step S200 and the subsequent steps of FIG. 3 are performed. After that, the vehicle occupant opens the passenger's seat door and closes the passenger's seat door. Then, the driver closes the driver's seat door. This means that the four entry-and-exit doors have been closed.

In this case, similar to the Specific Example 5 explained above, control again returns to step S301 to perform the processes of step S301 and the subsequent steps. Then, after a YES determination is made at step S307, a YES determination is made at step S308, i.e. a determination that the four entry-and-exit doors are closed.

Then, when the vehicle occupant opens the passenger's seat door, a YES determination is made at step S200a of FIG. 4 to perform the processes of step S301 and the subsequent steps of step S400.

After that, when the vehicle occupant closes the passenger's seat door, control returns to step S301 in the same manner as in the Specific Example 5 explained above to perform the processes of step S301 and the subsequent steps. Then, a YES determination is made at step S308, i.e. a determination that the four entry-and-exit doors are closed.

Thus, after making a YES determination at step S308 of FIG. 3 and a YES determination at step S308 of FIG. 4, control proceeds to step S322 of FIG. 5, followed by a NO determination at step S331, i.e. a determination that no comparison history is stored. Then, the timer is started at step S332 and control proceeds to step S341. At step S341, a YES determination is made, i.e. a determination that a YES determination has been made at step S307 of FIG. 3.

After that, if the driver, carrying the electronic key 10, stays in the communication area of the outside-cabin transmitter 31, a NO determination is repeated at step S345, in the same way as in the Specific Example 5 explained above, after performing such steps as step S342, a YES determination at step S343 and a NO determination at step S344, until the time measured by the timer becomes equal to or more than the predetermined time.

When the time measured by the timer becomes equal to or more than the predetermined time, a YES determination is made at step S345 to perform the processes of step S350 and the subsequent steps. Thus, the four entry-and-exit doors are locked.

According to the embodiment described above, the electronic control unit 50 may determine, at step S304, that the electronic key 10 is located in the communication area of the inside-cabin transmitter 30. In this case, the electronic control unit 50 may determine, at step S307 (S307a), that the electronic key 10 is located in the communication area of the outside-cabin transmitter 31 (32), and afterwards, may determine, at steps S312 and S313, that the electronic key 10 is not located in the communication area of the outside-cabin transmitter 31 (32). In such a case, the comparison history is stored in the memory 51.

As described above, the comparison history is a record indicating that the electronic key 10 has been determined as being located in the communication area of the outside-cabin transmitter 31 (32), and that, then, the electronic key 10 has been determined as not being located in the communication area of the outside-cabin transmitter 31 (32). The electronic control unit 50 locks the four entry-end-exit doors when comparison history is stored in the memory 51 and the four entry-and-exit doors are determined as being closed.

Thus, as in the Specific Example 3 explained above, when a driver carrying the electronic key 10 moves out of the communication area of the outside-cabin transmitter 31 (32), followed by the vehicle occupant's getting out of the vehicle and closing of the passenger's seat door, the comparison history is stored in the memory 51. Meanwhile, the four entry-and-exit doors are determined as being closed, and thus the four entry-and-exit doors are locked.

In the present embodiment, the electronic control unit 50 may determine that comparison history has been stored in the memory 51 and the four entry-and-exit doors are closed. In this case, prior to locking the entry-and-exit doors, the electronic control unit 50 may determine, at steps S351 and S352, whether or not the electronic key 10 is located in the vehicle cabin. Thus, the entry-and-exit doors are prevented from being locked in the state where the electronic key 10 is located in the vehicle cabin.

In the present embodiment, prior to determining whether or not the electronic key 10 is located in the communication area of the outside-cabin transmitter 31, the electronic control unit 50 may determine, at step S304, that the electronic key is located in the communication area of the inside-cabin transmitter 30. In such a case, the determination at step S304 is repeated until it is determined that the electronic key 10 is not located in the communication area of the inside-cabin transmitter 30.

Assuming that a NO determination is made once at step S304 and that the driver carrying the electronic key 10 does not have an intention of getting off the vehicle, the process of step S300 may be interrupted and restarted. In this case, when the electronic key 10 has actually moved out of the communication area of the inside-cabin transmitter 30 into the communication area of the outside-cabin transmitter 31, a long delay time may be caused in determining that the electronic key 10 is not located in the communication area of the inside-cabin transmitter 30.

In this regard, in the present embodiment, even when a NO determination is made once at step S304, a determination at step S304 is repeated until when a YES determination is made, i.e. a determination that the electronic key 10 is not located in the communication area of the inside-cabin transmitter 30. Therefore, when the electronic key 10 has actually moved out of the communication area of the inside-cabin transmitter 30 into the communication area of the outside-cabin transmitter 31, a YES determination is immediately made at step S304.

Figure 6:
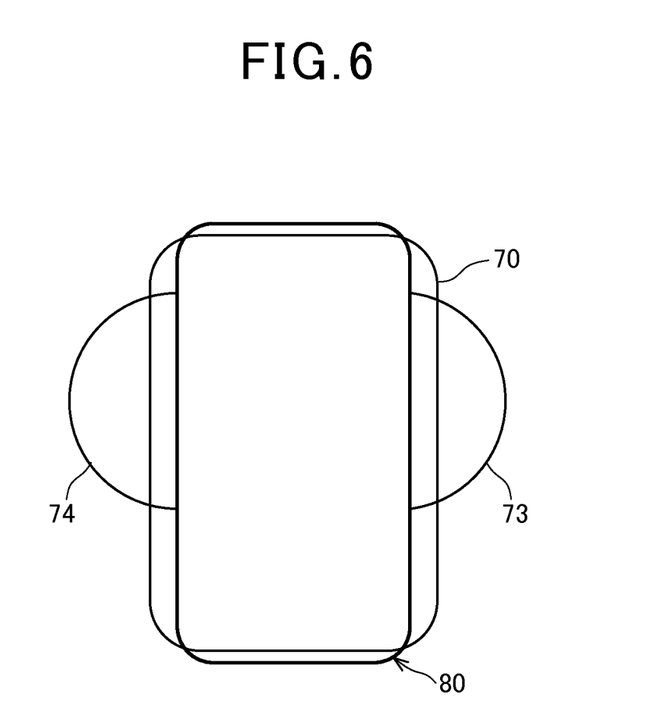
FIG. 6 is a diagram illustrating communication areas for an inside-cabin transmitter and an outside-cabin transmitter in the embodiment.

For example, the transmission output of the inside-cabin transmitter 30 may be raised so that a null point that disables communication between the inside-cabin transmitter 30 and the electronic key 10 would not be caused in the vehicle cabin. In this case, as shown in FIG. 6, the communication area of the inside-cabin transmitter 30 (the thick line indicated by reference 70 in FIG. 6) may be enlarged exceeding the outline of the vehicle (the thick line indicated by reference 80 in FIG. 6). Therefore, areas will be caused, in which the communication areas of the inside-cabin transmitters 31 and 32 (see references 73 and 74 of FIG. 6) overlap the communication area of the inside-cabin transmitter 30. Therefore, when the driver carrying the electronic key 10 is positioned in the overlapped areas mentioned above in getting off the vehicle, a NO determination is made at step S304. However, as described above, since the determination at step S304 is repeated until the electronic key 10 is determined as not being located in the communication area of the inside-cabin transmitter 30, a NO determination is made, at step S304, immediately after the driver has moved out of the overlapped areas.

Thus, control proceeds to step S305 and the subsequent steps, without causing a long delay time. Accordingly, the comparison history is promptly stored in the memory 51. In this way, the four entry-and-exit doors are quickly locked.

In the present embodiment, if no comparison history is stored in the memory 51, it is determined at step S331 of FIG. 5, whether or not a YES determination has been made at step S307, that is, it is determined whether or not the electronic key 10 has been located in the communication area of the outside-cabin transmitter 31. In other words, it is determined whether or not the driver carrying the electronic key 10 has stayed around the driver's seat door.

If a NO determination is made at step S331, i.e. a determination that the electronic key 10 is not located in the communication area of the outside-cabin transmitter 31, communication is established between the electronic key 10 located in the vicinity of the passenger's seat door and the outside-cabin transmitter 32. Then, an identification-code determination and a time-out determination are made, followed by locking the four entry-and-exit doors.

However, if a YES determination is made at step S331, i.e. a determination that the electronic key 10 has been located in the communication area of the outside-cabin transmitter 31, irrespective of whether or not a vehicle occupant carrying the electronic key 10 is positioned in the vicinity of the passenger's seat door, communication is established between the outside-cabin transmitter 31 and the electronic key 10, followed by an identification-code determination and a time-out determination to thereby lock the four entry-and-exit doors. In this way, in the case where both of the driver and a vehicle occupant get out of the vehicle, the entry-and-exit doors are locked based on the behavior of the driver carrying the electronic key 10 from when the driver gets off the vehicle and moves away from the vehicle.

In the embodiment described above, two outside-cabin transmitters 31 and 32 have been used, with the communication area of the outside-cabin transmitter 31 being set around the driver's seat door, and with the communication area of the outside-cabin transmitter 32 being set around the passenger's seat door. However, the present invention is not limited to the above embodiment. Alternatively, four outside-cabin transmitters may be used to independently provide communication areas for the respective four entry-and-exit doors.

In the embodiment described above, the driver's seat side detection process of FIG. 3 and the passenger's seat side detection process of FIG. 4 have been performed by the electronic control unit 50 in a time-sharing manner. Alternative to this, the electronic control unit 50 may be provided with two or more microcomputers to allow the two or more microcomputers to parallelly perform the driver's seat side detection process of FIG. 3 and the passenger's seat side detection process of FIG. 4.

In the embodiment described above, the communication area of the outside-cabin transmitter 31 has been set in an area including the vicinities of the driver's seat door and the rear-right seat door, while the communication area of the outside-cabin transmitter 32 has been set in an area including the vicinities of the passenger's seat door and the rear-right seat door. However, the present invention is not limited to the above embodiment. Alternatively, the communication area of the outside-cabin transmitter 31 may be set around the driver's seat door excepting the vicinity of the rear-right seat door, while the communication area of the outside-cabin transmitter 32 may be set around the passenger's seat door excepting the vicinity of the rear-right seat door.

What is claimed is:

1. An automatic locking system for vehicles that communicates with an electronic key in a predetermined range outside a vehicle cabin as a communication area and comprises an outside-cabin comparing unit for comparing an ID code included in a signal transmitted from the electronic key with an ID code registered in advance, the automatic locking system locking all entry-and-exit doors of a vehicle when a comparison result of the outside-cabin comparing unit has changed from OK to NG in a case where all of the entry-and-exit doors are closed; wherein the outside-cabin comparing unit communicates with the electronic key when a right-side entry-and-exit door is opened/closed to compare the ID code included in the signal transmitted from the electronic key with the ID code registered in advance, and communicates with the electronic key when a left-side entry-and-exit door is opened/closed to compare the ID code included in the signal transmitted from the electronic key with the ID code registered in advance;

the automatic locking system further comprises a comparison history storing unit that, when either one of the right-side entry-and-exit door and the left-side entry-and-exit door is opened/closed, stores comparison history in a memory when the comparison result of the outside-cabin comparing unit has changed from OK to NG in a case where not all of the entry-and-exit doors are closed; and all of the entry-and-exit doors are locked in a case where the comparison history has been stored in the memory when all of the entry-and-exit doors are closed.

2. The automatic locking system for vehicles according to claim 1, wherein the automatic locking system includes means for clearing comparison history stored in the memory when a predetermined time has expired in a state where not all of the entry-and-exit doors are closed after storage of the comparison history in the memory.

3. The automatic locking system for vehicles according to claim 2, wherein the automatic locking system comprises an inside-cabin comparing unit for communicating with the electronic key inside the vehicle cabin as a communication area and comparing the ID code included in the signal transmitted from the electronic key with the ID code registered in advance, and the comparison history storing unit stores comparison history in the memory when the comparison result of the inside-cabin comparing unit is NG and the comparison result of the outside-cabin comparing unit has changed from OK to NG in the case where not all of the entry-and-exit doors are closed.

4. The automatic locking system for vehicles according to claim 3, wherein all of the entry-and exit doors are locked when the predetermined time has expired, with the comparison result of the outside-cabin comparing means remaining OK, in the case where all of the entry-and-exit doors are closed.

5. The automatic locking system for vehicles according to claim 2, wherein all of the entry-and exit doors are locked when the predetermined time has expired, with the comparison result of the outside-cabin comparing means remaining OK, in the case where all of the entry-and-exit doors are closed.

6. The automatic locking system for vehicles according to claim 1, wherein the automatic locking system comprises an inside-cabin comparing unit for communicating with the electronic key inside the vehicle cabin as a communication area and comparing the ID code included in the signal transmitted from the electronic key with the ID code registered in advance, and the comparison history storing unit stores comparison history in the memory when the comparison result of the inside-cabin comparing unit is NG and the comparison result of the outside-cabin comparing unit has changed from OK to NG in the case where not all of the entry-and-exit doors are closed.

7. The automatic locking system for vehicles according to claim 1, wherein all of the entry-and exit doors are locked when a predetermined time has expired, with the comparison result of the outside-cabin comparing means remaining OK, in the case where all of the entry-and-exit doors are closed.

* * * * *